(12) United States Patent
Andersen et al.

(10) Patent No.: US 9,369,894 B2
(45) Date of Patent: Jun. 14, 2016

(54) ANALYSIS OF A COMMUNICATION EVENT

(75) Inventors: Sören Vang Andersen, Esch-sur-Alzette (LU); André Karpištšenko, Tallinn (EE); Teele Tamme, Tallinn (EE); Devid Liik, Kohila (EE); Andre Veski, Tallinn (EE); Ando Saabas, Tallinn (EE); Markus Vaalgamaa, Helsinki (FI)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/306,224

(22) Filed: Nov. 29, 2011

(65) Prior Publication Data
US 2013/0058221 A1   Mar. 7, 2013

(30) Foreign Application Priority Data

Sep. 6, 2011 (GB) .................................. 1115366.5

(51) Int. Cl.
*H04L 12/26* (2006.01)
*H04W 24/08* (2009.01)
(Continued)

(52) U.S. Cl.
CPC ........... *H04W 24/08* (2013.01); *H04L 41/0631* (2013.01); *H04L 43/08* (2013.01); *H04L 43/087* (2013.01); *H04L 43/0829* (2013.01); *H04W 48/18* (2013.01)

(58) Field of Classification Search
CPC ..... H04L 12/26; H04L 47/10; H04L 12/5602; H04L 2012/5636; H04W 24/08; H04W 48/18
USPC .......... 370/236–238, 389, 392, 400–401, 351
See application file for complete search history.

(56) References Cited

U.S. PATENT DOCUMENTS 5,438,568 A * 8/1995 Weisser, Jr. ................... 370/389
5,771,467 A * 6/1998 Sato ....................... H04W 88/02
                                                              358/442

(Continued)

FOREIGN PATENT DOCUMENTS

| CN | 1498382 | 5/2004 |
|---|---|---|
| CN | 1529959 | 9/2004 |

OTHER PUBLICATIONS

"Search Report", GB Application No. 1115366.5, (Dec. 21, 2012), 3 pages.

(Continued)

*Primary Examiner* — Chandrahas Patel
*Assistant Examiner* — Lan Huong Truong
(74) *Attorney, Agent, or Firm* — Tom Wong; Micky Minhas

(57) ABSTRACT

Method, system, device, server and computer program product for analyzing a communication event occurring over a network, wherein a network service provider provides access to the network for a communication client executed at the device to engage in the communication event. The communication client detects a problem with the communication event. Communication metric data relating to the communication event is determined. It is determined, using the determined communication metric data, whether the detected problem is caused by a reason (i) of a poor network condition in the network, or a reason (ii) of the network service provider discriminating against transmission over the network of a type of data used in the communication event. In the event that it is determined that the detected problem is caused by reason (ii), a notification is provided to a user of the device.

22 Claims, 3 Drawing Sheets

(51) Int. Cl.
 *H04L 12/24* (2006.01)
 *H04W 48/18* (2009.01)

(56) References Cited

U.S. PATENT DOCUMENTS

| | | | | |
|---|---|---|---|---|
| 7,173,910 | B2 * | 2/2007 | Goodman | H04L 41/5003 370/252 |
| 7,213,260 | B2 * | 5/2007 | Judge | 726/3 |
| 7,764,600 | B1 * | 7/2010 | Lima | H04L 47/10 370/217 |
| 7,826,391 | B2 * | 11/2010 | Van Slyke | H04L 12/5601 370/252 |
| 8,135,125 | B2 * | 3/2012 | Sidhu et al. | 379/265.03 |
| 8,275,990 | B2 * | 9/2012 | Shen | H04L 12/58 380/247 |
| 8,385,915 | B2 * | 2/2013 | Petronelli | H04W 4/16 370/310.2 |
| 8,630,191 | B2 * | 1/2014 | Forbes et al. | 370/252 |
| 2005/0128955 | A1 * | 6/2005 | Chang et al. | 370/252 |
| 2006/0198310 | A1 * | 9/2006 | Stieglitz | H04L 41/0631 370/241 |
| 2006/0217115 | A1 | 9/2006 | Cassett et al. | |
| 2006/0217116 | A1 | 9/2006 | Cassett et al. | |
| 2008/0031425 | A1 * | 2/2008 | Glynn et al. | 379/32.04 |
| 2008/0175362 | A1 * | 7/2008 | Bangor et al. | 379/114.01 |
| 2009/0100172 | A1 * | 4/2009 | Chen | G06F 9/5061 709/224 |
| 2009/0196186 | A1 * | 8/2009 | Lidstrom et al. | 370/241 |
| 2010/0011108 | A1 * | 1/2010 | Clark | H04W 76/002 709/227 |
| 2010/0146105 | A1 * | 6/2010 | Lundstrom | G06Q 10/02 709/224 |
| 2010/0198590 | A1 * | 8/2010 | Tackin et al. | 704/214 |
| 2010/0220591 | A1 * | 9/2010 | Zhang | 370/230.1 |
| 2011/0071930 | A1 * | 3/2011 | Bhatt | G06Q 20/227 705/30 |
| 2011/0231551 | A1 * | 9/2011 | Hassan et al. | 709/226 |

OTHER PUBLICATIONS

"International Search Report", Mailed Date: Dec. 14, 2012, Application No. PCT/US2012/054015, Filed date: Sep. 6, 2012, pp. 8.
"Foreign Office Action", CN Application No. 201210326541.4, Aug. 14, 2014, 12 pages.
"Foreign Office Action", CN Application No. 201210326541.4, Jul. 3, 2015, 13 pages.
"Foreign Office Action", CN Application No. 201210326541.4, Mar. 2, 2016, 12 pages.

* cited by examiner

ANALYSIS OF A COMMUNICATION EVENT

RELATED APPLICATION

This application claims priority under 35 U.S.C. §119 or 365 to Great Britain, Application No. GB1115366.5, filed Sep. 6, 2011. The entire teachings of the above application are incorporated herein by reference.

TECHNICAL FIELD

The present invention relates to analysis of a communication event. In particular the present invention relates to analyzing a communication event occurring over a network wherein access to the network is provided by a network service provider.

BACKGROUND

Communication systems allow communication events, such as audio calls, video calls, instant messaging sessions, call forwarding, short message service (sms) messaging sessions and file transfers to occur between devices over a network, or login of a device to the communication system or a friend request in the communication system. The quality of the transmission of data during a communication event can be affected by a number of different factors, such as the conditions (e.g. congestion and bandwidth) of the network. When a user is using a device to engage in a communication event over a network it may be beneficial to provide an indication to the user of the quality of the transmission of data relating to the communication event over the concrete network or if the communication event could not be established, then information about that.

For example, in one arrangement a "Call Quality" indicator button is implemented in a user interface at a device, so that the user of the device can check network speed conditions for the current setup of the device. There may also be dynamic content notifications provided to the user during a call (or other communication event), when the device detects bad network conditions or implements a call drop recovery procedure. For example, the notifications can be useful in informing the user that a problem with a communication event (such as a degradation in the quality of the communication event) is due to poor conditions on the network. This may help the user to overcome the problem. Furthermore, even if the user is unable to overcome the problem, informing the user that a problem with a communication event is caused by problems on the network can help to alleviate the user's frustration with the problem.

SUMMARY

The inventors have realized that network service providers (e.g. "network operators" and "internet service providers") may manipulate or block network traffic either on a contractual or a non-contractual basis. A country government may also block some network traffic. Some network service providers detect and discriminate against certain types of network traffic which may be used in communication events, such as Voice over Internet Protocol (VoIP) traffic which is used to transmit voice communications and multimedia sessions over the Internet. For example, a network service provider may implement traffic shaping to delay some types of data more than others, which may have a detrimental effect on the quality of a communication event occurring over the network. In prior art notification schemes, such as those described above, a notification may be provided to indicate that a problem occurring with a communication event is caused by conditions on the network, but the inventors have realized that it may be beneficial to specifically analyze the cause of the problem further and to notify a user when the cause of a problem is that a network service provider is discriminating against transmission of a type of data (e.g. blocking the type of data) used in the communication event. The inventors have realized that it can be beneficial to distinguish this particular cause from other causes which result in poor network conditions because a solution to a problem having this particular cause may be found in a different manner (e.g. by switching to a different network service provider) compared to solutions to problems having other causes (e.g. a high level of congestion on the network). For example, switching to a different network service provider may not alleviate a problem caused by a high level of congestion on the network.

According to a first aspect of the invention there is provided a method of analyzing a communication event occurring over a network, wherein a network service provider provides access to the network for a communication client executed at a device to engage in the communication event, the method comprising: the communication client detecting a problem with the communication event; determining communication metric data relating to the communication event; using the determined communication metric data to determine whether the detected problem is caused by a reason (i) of a poor network condition in the network, or a reason (ii) of the network service provider discriminating against transmission over the network of a type of data used in the communication event; and in the event that it is determined that the detected problem is caused by reason (ii), providing a notification to a user of the device. The problem with the communication event may be a problem with setting up the communication event or with executing the communication event. Setting up the communication event may involve the use of web based features for the communication client to function correctly in the communication event. For example payments functionality may be based on showing web pages to the user via the communication client. Usage of those web pages may relate to setting up the communication event and the transfer of those web pages (e.g. from a server on the network) may be discriminated against by the network service provider. The transfer speed of those web pages may be considered in notifying the user about discrimination against transmission of a type of data used in the communication event.

This allows the user to be notified when the network service provider is discriminating against transmission of a type of data used in the communication event. Knowledge of the cause of a problem with the communication event can reduce or alleviate the user's frustration with the problem. In preferred embodiments, network conditions are analyzed during real-time application usage for the communication event and notifications are triggered in real-time based on conditions accounting for characteristics of the network service provider. This allows the user to attribute a poor user experience, or "problem" with the communication event, objectively. Furthermore, knowledge of the cause of the problem with the communication event may be useful in determining a solution to the problem.

Different network service providers may implement different traffic shaping schemes, such that some network service providers may discriminate more than others against a type of data used in a communication event. In that case it may be beneficial to change which network service provider is used to provide access to the network, to thereby improve the quality of communication events over the network. In this sense, preferred embodiments allow the user to make informed choices about which network service provider to use by suggesting alternative network service providers, e.g. as part of the notification that the detected problem is caused by the network service provider discriminating against transmission over the network of a type of data used in the communication event.

Embodiments of the invention advantageously consider characteristics of the network service provider in tests or notifications. Furthermore, embodiments of the invention advantageously allow for network service provider specific testing during application usage during a specific communication event.

The notification may include a suggestion that the user uses another network service provider.

The step of determining whether the detected problem is caused by reason (i) or reason (ii) may use the determined communication metric data and other data relating to the network. Said other data may comprise other communication metric data relating to transmission through the network of data other than that relating to the communication event. For example, said other data may comprise at least one of: (a) communication metric data from the user when using another network service provider; (b) communication metric data from another user using said network service provider; (c) communication metric data from another user using another network service provider; (d) network conditions experienced by another type of data other than that used in the communication event which is transmitted over said network; (e) data relating to the configuration of the network; (f) data relating to characteristics of the operation of the network; (g) historical data from the user when using said network service provider; and (h) historical notifications shown to the user when using said network service provider or another network service provider.

The step of determining whether the detected problem is caused by reason (i) or reason (ii) may comprise comparing said determined communication metric data to at least one model.

The method may further comprise computing a confidence value indicative of the certainty with which the detected problem is caused by reason (ii), and wherein the form of the notification depends upon the confidence value.

The step of providing a notification to a user of the device may comprise the communication client outputting a notification to a user of the device. Alternatively, in the event that the detected problem prevents the notification being provided to the user via the communication client then said step of providing a notification to a user of the device may comprise sending a message including the notification to the user using a communication process which is separate from the communication client. The message may comprise an email message or a Short Message Service message.

The network service provider may discriminate against transmission over the network of a type of data used in the communication event by performing traffic shaping on data that passes over the network.

The communication event may be one of a file transfer, an audio call, a video call, an instant messaging session, a short message service messaging session, call forwarding, login of the device to the communication system, and a friend request in the communication system.

The communication metric data may be indicative of at least one of (i) a bandwidth experienced by the communication event on the network, (ii) a latency experienced by the communication event on the network, (iii) a jitter experienced by the communication event on the network, (iv) a packet loss experienced by the communication event on the network, (v) an identifier of the network service provider, (vi) a country of the user, (vii) a country of a destination of the communication event, and (viii) an identifier of the user.

The step of detecting a problem with the communication event may comprise determining whether the detected communication metric data is indicative of a scenario in which it is likely that the network service provider is discriminating against transmission over the network of a type of data used in the communication event, wherein said step of determining whether the detected problem is caused by reason (i) or reason (ii) may be performed responsive to determining that the communication metric data is indicative of said scenario. It may be determined that the detected communication metric data is indicative of said scenario when at least one of (i) a quality degradation is experienced in the communication event but a similar quality degradation is not experienced for data other than that of the communication event being transmitted over the network; (ii) the quality of the communication event suddenly degrades; (iii) the communication event could not be established; and (iv) the quality of the communication event degrades continuously.

The step of determining whether the detected problem is caused by reason (i) or reason (ii) may be performed on a server of the network and the method may further comprise transmitting said determined communication metric data from the communication client to the server.

According to a second aspect of the invention there is provided a system comprising a device and a network, wherein a network service provider is arranged to provide access to the network for a communication client executed at the device to engage in a communication event over the network, wherein the communication client comprises means for detecting a problem with the communication event, and wherein the system comprises: means for determining communication metric data relating to the communication event; means for using the determined communication metric data to determine whether the detected problem is caused by a reason (i) of a poor network condition in the network, or a reason (ii) of the network service provider discriminating against transmission over the network of a type of data used in the communication event; and means for providing a notification to a user of the device in the event that the detected problem is caused by reason (ii).

The system may comprise a server and the means for using the determined communication metric data may be implemented at the server. Alternatively, the means for determining communication metric data, the means for using the determined communication metric data and the means for providing notification may be implemented by the communication client.

According to a third aspect of the invention there is provided a device for analyzing a communication event occurring over a network, wherein a network service provider provides access to the network for a communication client executed at the device to engage in the communication event, the device comprising: means for detecting a problem with the communication event; means for determining communication metric data relating to the communication event; means for transmitting the determined communication metric data to a server of the network; means for receiving, from the server, an indication as to whether the detected problem is caused by a reason (i) of a poor network condition in the network, or a reason (ii) of the network service provider discriminating against transmission over the network of a type of data used in the communication event; and means for providing a notification to a user of the device in the event that the indication indicates that the detected problem is caused by reason (ii).

According to a fourth aspect of the invention there is provided a server of a network for analyzing a communication event occurring over the network, wherein a network service provider provides access to the network for a communication client executed at a device to engage in the communication event, the server comprising: means for receiving, from the device, communication metric data relating to the communication event; means for using the determined communication metric data to determine whether a problem with the communication event is caused by a reason (i) of a poor network condition in the network, or a reason (ii) of the network service provider discriminating against transmission over the network of a type of data used in the communication event; and means for transmitting, to the device, a notification to be output to a user of the device in the event that the problem is caused by reason (ii).

According to a fifth aspect of the invention there is provided a device for analyzing a communication event occurring over a network, wherein a network service provider provides access to the network for a communication client executed at the device to engage in the communication event, the communication client comprising: means for detecting a problem with the communication event; means for determining communication metric data relating to the communication event; means for using the determined communication metric data to determine whether the detected problem is caused by a reason (i) of a poor network condition in the network, or a reason (ii) of the network service provider discriminating against transmission over the network of a type of data used in the communication event; and means for providing a notification to a user of the device in the event that the detected problem is caused by reason (ii).

According to a sixth aspect of the invention there is provided a computer program product for analyzing a communication event occurring over a network, wherein a network service provider provides access to the network for a communication client executed at a device to engage in the communication event, and the computer program product being embodied on a non-transient computer-readable medium and configured so as when executed on a processor of the device to perform any of the methods described herein.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only.

Figure 1:
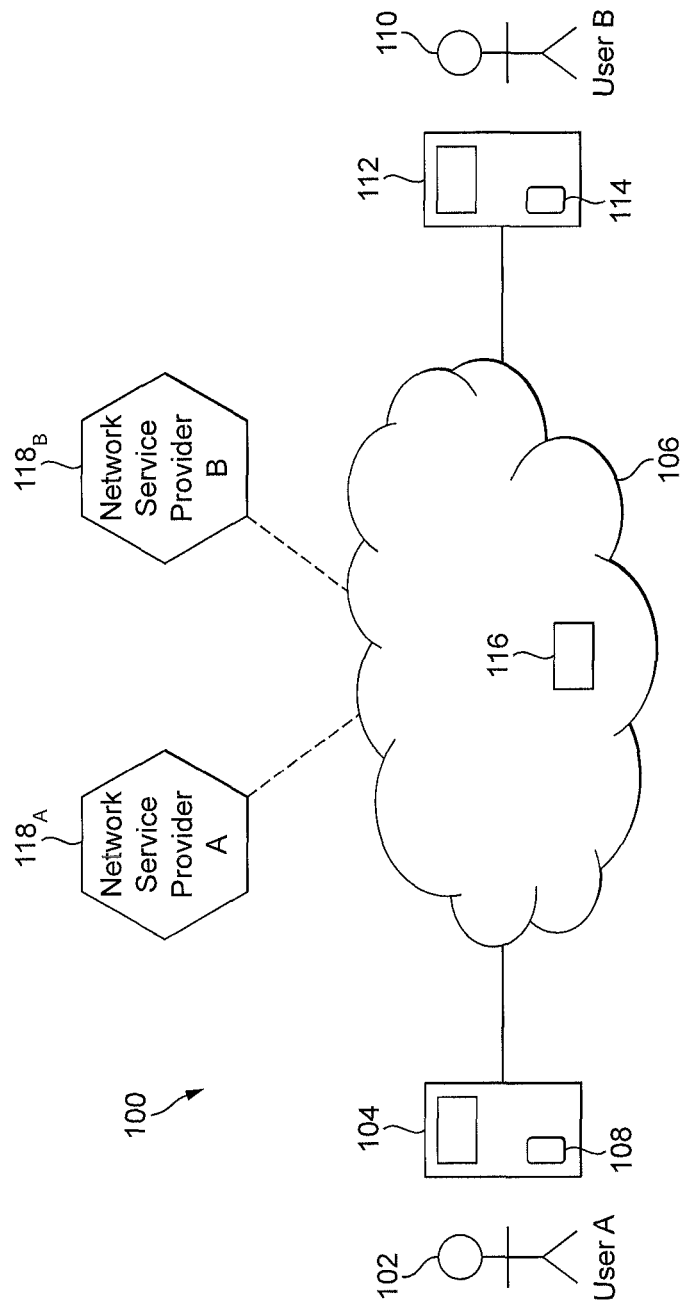
FIG. 1 shows a communication system according to a preferred embodiment.

FIG. 1 shows a communication system 100 comprising a first user ("User A") 102 who has an associated first user device 104 and a second user ("User B") 110 who has an associated second user device 112. The user devices 104 and 112 can communicate over the network 106 in the communication system, thereby allowing the users 102 and 110 to communicate with each other over the network 106. In the preferred embodiment the communication system is a packet-based, VoIP communication system, but other types of communication system could also be used, such as Peer-to-Peer (P2P), non-P2P or IM systems. The network 106 may, for example, be the Internet, but in alternative embodiments the network 106 could be any other suitable network which allows data to be transmitted between end points, such as an intranet. The network service providers $118_A$ and $118_B$ provide access to the network 106 for the devices 104 and 112. The devices 104 and 112 may, or may not, use the same network service provider for connecting to the network 106. The users 102 and 110 may or may not have a choice as to which network service provider (e.g. $118_A$ or $118_B$) to use to access the network 106. The user device 104 may be, for example, a mobile phone, a personal digital assistant ("PDA"), a personal computer ("PC") (including, for example, Windows™, Mac OS™ and Linux™ PCs), a television and remote control, a gaming device or other embedded device able to connect to the network 106. The user device 104 is arranged to receive information from and output information to the user 102 of the user device 104. In a preferred embodiment of the invention the user device 104 comprises a display such as a screen and an input device such as a keyboard, mouse, touch-screen, keypad and/or joystick. The user device 104 is connected to the network 106. The network 106 comprises a server 116 which can be used to facilitate communication over the network 106. Other servers may also be included in the network 106 but only one server (server 116) is shown in FIG. 1 for clarity. Data may be split into data packets for transmission over the network 106.

Note that in alternative embodiments, the user device 104 can connect to the network 106 via additional intermediate networks not shown in FIG. 1. For example, if the user device 104 is a mobile device, then it can connect to the network 106 via a cellular mobile network, not shown in FIG. 1.

The user device 104 executes a communication client 108, provided by a software provider associated with the communication system 100. The communication client 108 is a software program executed on a local processor in the user device 104. The client 108 performs the processing required at the user device 104 in order for the user device 104 to transmit and receive data over the communication system 100. As is known in the art, the client 108 may be authenticated to communicate over the communication system 100 through the presentation of digital certificates (e.g. to prove that User A 102 is a genuine subscriber of the communication system 100—described in more detail in WO 2005/009019).

The user device 112 corresponds to the user device 104. The user device 112 executes, on a local processor, a communication client 114 which corresponds to the communication client 108. The client 114 performs the processing required to allow the user 110 to communicate over the network 106 in the same way that the client 108 performs the processing required to allow the user 102 to communicate over the network 106. FIG. 1 shows only two users (102 and 110) for clarity, but many more users may be connected to the communication system 100, and may communicate over the communication system 100 using respective communication clients executed on respective user devices, as is known in the art. Likewise, the communication system 100 may include one or more network service providers, but two network service providers ($118_A$ and $118_B$) are shown in FIG. 1 for clarity.

Figure 2:
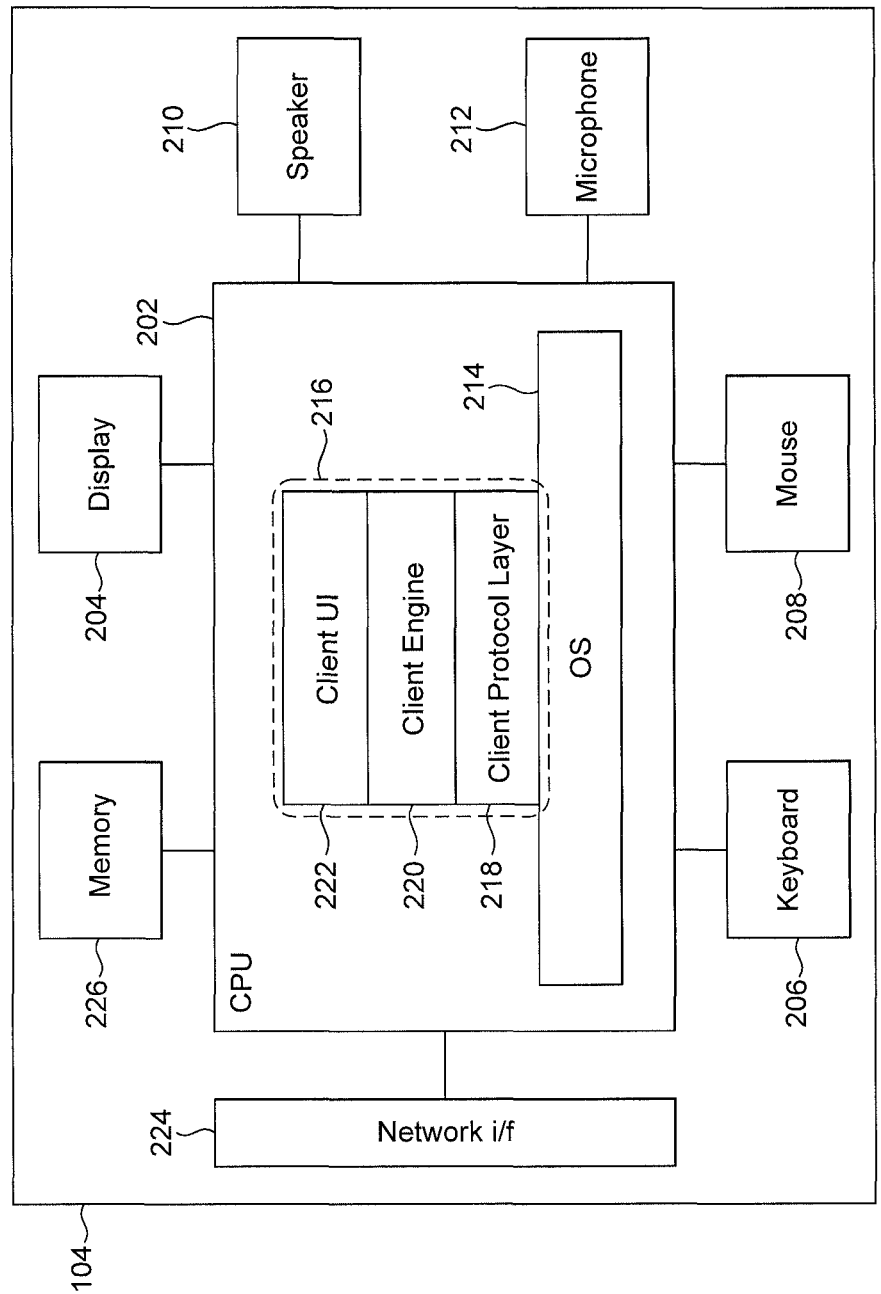
FIG. 2 shows a block diagram of a user device according to a preferred embodiment.

FIG. 2 illustrates a detailed view of the user device 104 on which is executed client 108. The user device 104 comprises a central processing unit ("CPU") 202, to which is connected a display 204 such as a screen, input devices such as a keyboard (or a keypad) 206 and a pointing device such as a mouse (or joystick) 208. The display 204 may comprise a touch screen for inputting data to the CPU 202. An output audio device 210 (e.g. a speaker) and an input audio device 212 (e.g. a microphone) are connected to the CPU 202. The display 204, keyboard 206, mouse 208, output audio device 210 and input audio device 212 are integrated into the user device 104. In alternative user devices one or more of the display 204, the keyboard 206, the mouse 208, the output audio device 210 and the input audio device 212 may not be integrated into the user device 104 and may be connected to the CPU 202 via respective interfaces. One example of such an interface is a USB interface. The CPU 202 is connected to a network interface 224 such as a modem for communication with the network 106. The network interface 224 may be integrated into the user device 104 as shown in FIG. 2. In alternative user devices the network interface 224 is not integrated into the user device 104. The user device 104 also comprises a memory 226 for storing data as is known in the art.

FIG. 2 also illustrates an operating system ("OS") 214 executed on the CPU 202. Running on top of the OS 214 is a software stack 216 for the client 108. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the device 104 and handles data being transmitted to and from the network 106 via the network interface 224. The client protocol layer 218 of the client software communicates with the operating system 214 and manages the connections over the communication system 100. Processes requiring higher level processing are passed to the client engine layer 220. The client engine 220 also communicates with the client user interface layer 222. The client engine 220 may be arranged to control the client user interface layer 222 to present information to the user 102 via the user interface of the client 108 and to receive information from the user 102 via the user interface.

The user device 112 is implemented in the same way as user device 104 as described above, wherein the user device 112 may have corresponding elements to those described herein in relation to user device 104.

Figure 3:
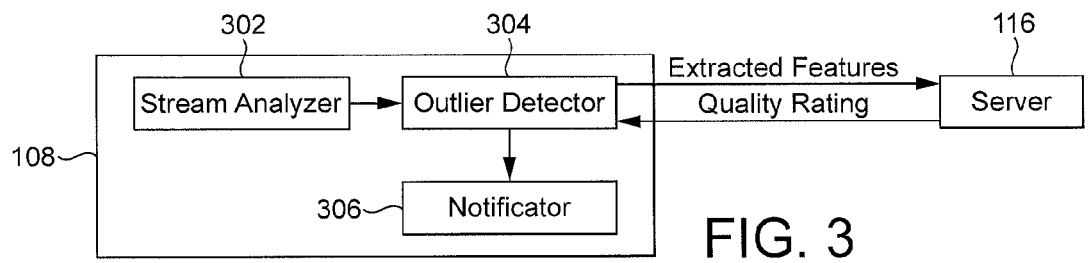
FIG. 3 illustrates components within a preferred embodiment.
Figure 4:
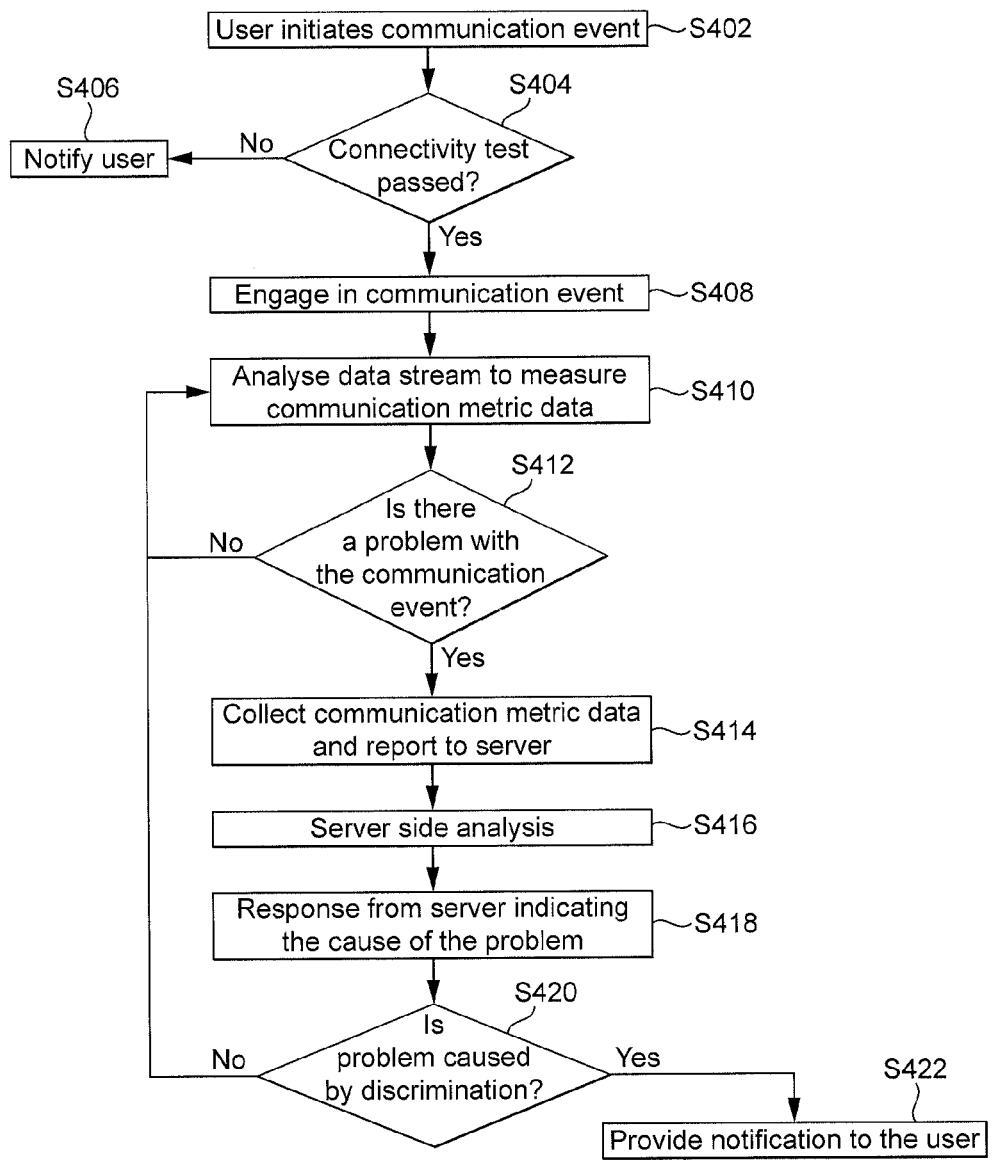
FIG. 4 is a flow chart for a process of analyzing a communication event according to a preferred embodiment.

With reference to FIGS. 3 and 4 there are described below methods of analyzing a communication event according to preferred embodiments. In the methods, the communication client 108 collects communication event specific metrics and notifies the user 102 about poor network conditions on the network 106 caused by traffic shaping of the network service provider $118_A$ which discriminates against the traffic of the communication event.

FIG. 3 shows component blocks of the client 108 and the server 116 which are used to implement the methods and FIG. 4 is a flow chart for implementing the methods of preferred embodiments. As shown in FIG. 3, the client 108 comprises a stream analyzer block 302, an outlier detector block 304 and a notificator block 306. An output of the stream analyzer block 302 is coupled to an input of the outlier detector block 304. A first output of the outlier detector block 304 is coupled to an input of the notificator block 306. A second output of the outlier detector block 304 is coupled (over the network 106) to an input of the server 116. An output of the server 116 is coupled (over the network 106) to an input of the outlier detector block 304.

In step S402 the user 102 initiates a communication event at the client 108. The communication event is a real-time event of data transfer between two end points of the communication system 100. The communication event may be initiated by transmitting or accepting a file transfer, or starting or accepting a call (e.g. an audio call or a video call between the users 102 and 110) or starting or accepting an instant messaging session. The client 108 is provided access to the network 106 by one of the network service providers, e.g. network service provider $118_A$. In an example described below the communication event is an audio call over the network 106 between the users 102 and 110 using devices 104 and 112, wherein the call is initiated by the user 102.

In step S404 basic connectivity measurements are measured by the client 108 to test the connectivity with the server 116 and the P2P availability over the network 106. In this way the client 108 checks that the communication event is able to proceed over the network 106. The details of the basic connectivity measurements performed in step S404 for initiating communication events are known in the art, and as such, are not described in detail herein.

If the connectivity test(s) of step S404 is(are) not successfully passed then the communication event cannot be successfully initiated and the method passes to step S406 in which the client 108 notifies the user 102 that the communication event cannot be initiated. It may be determined that the communication event cannot be initiated in step S404, for example, when there is no valid route through the network between end points of the communication event or when the quality of data transmission through the network 106 between end points of the communication event is below a particular quality threshold. The particular quality threshold may be set and/or adjusted by the network operator $118_A$ and/or by the user 102. The notification provided to the user in step S406 might provide details to the user 102 of the reason that the communication event cannot be initiated.

If the connectivity test of step S404 is successfully passed then the method passes to step S408 in which the client 108 engages in the communication event such that the users 102 and 110 partake in the audio call over the network 106. As described above, the network service provider $118_A$ provides access to the network 106 for the client 108 for the purposes of the communication event.

While the communication event is proceeding, communication metric data is measured locally at the client 108 over a time period (as denoted by step S410). It is the stream analyzer block 302 of the client 108 that performs the measurement of the communication metric data. The communication metric data is indicative of any network quality metric, for example the communication metric data may include data relating to: the bandwidth of the connection used by the communication event over the network 106; the latency experienced by the communication event on the network; the jitter on the data stream transmitted in the communication event over the network 106; the packet loss experienced by the data stream transmitted in the communication event over the network 106; and the Autonomous System Number (ASN) of the connection used by the communication event over the network 106, where the ASN is used to identify the network service provider $118_A$. The communication metric data is not limited to the examples given above and may include other data for use in analyzing the communication event. The communication metric data collected by the stream analyzer block 302 is passed to the outlier detector block 304 of the client 108.

In step S412 it is determined whether there is a problem with the transmission of data over the network 106 in the communication event. In other words, a problem with the communication event can be detected in step S412. In particular, the outlier detector block 304 determines in step S412 whether the communication metric data is indicative of a problem with the transmission of data in the communication event which may be due to discrimination by the network service provider $118_A$ against transmission of the data of the communication event over the network 106. For example, the collected communication metric data is initially analyzed by the outlier detector block 304 in conjunction with traffic shaping detection models for simple shaping scenarios. This in-client detection mechanism detects unjustified exceeding of predefined thresholds for given network characteristics/metrics in order to detect a problem with the communication event which may be caused by discrimination by the network service provider $118_A$. For example, if the detection mechanism detects quality degradation on particular network metrics for data of the communication event (e.g. VoIP data), whereas a similar quality degradation in the same characteristics is not present in comparable traffic composed of data of other types (e.g. non-VoIP data) then it is determined in step S412 that the communication metric data may be indicative of discrimination by the network service provider $118_A$. As another example, if the quality of the communication event suddenly degrades on an otherwise generally good-quality data stream (e.g. VoIP stream) then it is determined in step S412 that the communication metric data may be indicative of discrimination by the network service provider $118_A$. Other scenarios and characteristics of the communication metric data may also be determined in step S412 to be indicative of discrimination by the network service provider $118_A$ against transmission over the network of a type of data used in the communication event. Cases in which it is determined in step S412 that the communication metric data is indicative of discrimination by the network service provider $118_A$ against transmission over the network of a type of data used in the communication event are termed "suspicious cases" herein.

If it is determined in step S412 that the communication metric data is not indicative of discrimination by the network service provider $118_A$ against transmission over the network of a type of data used in the communication event then the method passes back to step S410 and the analysis of the data stream to measure communication metric data continues during the communication event.

However, for suspicious cases, the method proceeds to step S414 in which the outlier detector block 304 collects the communication metric data relating to the suspicious case together with an indication of the type of communication event (e.g. audio call) that the communication metric data relates to and the username of the user 102. The outlier detector block 304 reports this collected information (denoted "extracted features" in FIG. 3) to the server 116 for further analysis. The extracted features are transmitted over the network 106 to the server 116 (preferably using a different type of data for the transmission than that used in the communication event which may be being discriminated against by the network service provider $118_A$).

In step S416 the server 116 performs analysis on the extracted features, including the communication metric data, to determine whether the detected problem is caused by a poor network condition in the network, or by the network service provider $118_A$ discriminating against transmission over the network of a type of data used in the communication event. As part of this analysis, the server 116 compares the communication metric data received from the client 108 with at least one of the following:
communication metric data from the user 102 when using another network provider (e.g. $118_B$ or another network service provider not shown in FIG. 1);
communication metric data from another user (e.g. user 110) which also uses the network service provider $118_A$ for transmission of VoIP data over the network 106;
communication metric data from another user (e.g. user 110) using another network service provider (e.g. $118_B$ or another network service provider not shown in FIG. 1) to which the user 102 may be able to switch to if necessary (e.g. another network service provider in the same country as the first network service provider $118_A$) for transmission of VoIP data over the network 106;
network conditions experienced by another type of data (e.g. non-VoIP data) other than that used in the communication event which is transmitted over the network 106;
data relating to the configuration of the network 106, e.g. the behavior of address translation devices reported to the server 116 from the client 108;
data relating to characteristics of the operation of the network 106, i.e. network characteristics such as gaps in the network service (e.g. for cell handovers in mobile networks);
historical data from the user when using said network service provider; and
historical notifications shown to the user when using said network service provider or another network service provider.

As part of the server's analysis in step S416 the communication metric data received from the client 108 is compared to a model or ensemble of models (most of which will be maintained in the server 116). As a result of the analysis by the server 116 in step S416 a determination as to the cause of the problem with the communication event can be made. In particular, it can be determined whether the problem is due to discrimination by the network service provider $118_A$ against the transmission of a type of data used in the communication event. For example, if the communication metric data indicates that the data of the communication event is experiencing a much lower quality of service over the network than other types of data then it is determined that the network service provider $118_A$ is discriminating against the type of data used in the communication event. It can also be seen whether other network service providers (e.g. $118_B$) also discriminate against the type of data that is discriminated against by network service provider $118_A$.

If all transmissions of data are experiencing a poor quality of service over the network then there may be a more general problem with the network (e.g. the network may be highly congested, or a node in the network may have failed) which is causing the problem with the communication event and which is not the result of discrimination by the network service provider $118_A$. As described above, the server analysis performed in step S416 determines whether a poor quality of service through the network 106 is due to a generally poor network or due to discrimination by the network service provider $118_A$.

In step S418, a response (denoted "Quality Rating" in FIG. 3) from the server 116 indicating the cause of the problem with the communication event is sent to the outlier detector block 304 of the client 108. The response indicates to the client 108 whether the user 102 is in a network 106 where the conditions are being unusually bad and/or whether the network conditions are being manipulated by the network service provider $118_A$.

In step S420 the client 108 uses the response from the server 116 to ascertain whether the problem with the transmission of data over the network in the communication event is caused by discrimination by the network service provider $118_A$ against a type of data used in the communication event. If the result of the determination made in step S420 is negative then the method passes back to step S410 and no notification is output to the user because it has been determined that the problem is not due to discrimination by the network service provider $118_A$. In alternative embodiments a notification may be output to the user 102 in this situation to explain that the problem is due to poor network conditions on the network 106 and may also explain that the problem is not due to discrimination by the network service provider $118_A$.

However, if the result of the determination made in step S420 is in the affirmative then the method passes to step S422 in which the client 108 outputs a notification to the user 102 at the device 104. In this way, in the event that it is determined that the detected problem is caused by the network service provider $118_A$ discriminating against transmission over the network of a type of data used in the communication event then a notification is provided to the user 102. The notification may be output using the display 204 and/or speakers 210 of the device 104, for example using the client UI 222.

The server 116 or the client 108 may compute a confidence value indicative of the certainty with which the detected problem is caused by discrimination by the network service provider $118_A$. The confidence value can be computed using the communication metric data collected by the client 108. The computation may also use one or more of the pieces of information listed above in bullet points which relate to other conditions in the network, e.g. the communication metric data collected from other users in the communication system 100. The confidence value can then be compared with a confidence threshold. In some embodiments, the notification may only be output in step S422 if the confidence value exceeds the confidence threshold. In other embodiments, the form of the notification may depend upon whether the confidence value exceeds the confidence threshold. For example, depending upon whether the confidence value exceeds the confidence threshold, the notification provided in step S422 may merely inform the user 102 of circumstances or the notification may promote the use of another network service provider (e.g. $118_B$). For example, the notification may include a suggestion that the user 102 uses network service provider $118_B$ because it has been determined in the server analysis performed in step S416 that the network service provider $118_B$ would not discriminate against transmission of the type of data used in the communication event, whereas the transmission of that same type of data is discriminated against by network service provider $118_A$.

There is therefore described above a system and method for notifying a user when a problem with the transmission of data in a communication event is due to discrimination by the network service provider $118_A$ against transmission of a type of data used in the communication event.

In the embodiments described above, the notifications are output from the client 108. For example, the notifications may be sent from the server 116 to the client 108 (or, in some embodiments, decided in client 108 locally) for output to the user 102 via the client UI 222 on the device 104, e.g. using dynamic content such that the notification is triggered based on predefined rules between the client 108 and the server 116 which can be updated dynamically. Alternatively, specialized UI changes may be made for notifications as determined by the client 108. In this sense different delivery channels are feasible for the notifications depending on the scenario.

In some alternative cases, the client 108 is unable to receive notifications from the server 116, for example because the network service provider $118_A$ is blocking all data relating to communication between the client 108 and the network 106 or because the network service provider $118_A$ is blocking notifications from being delivered to the client 108. The notification can be sent to the user 102 by sending an e-mail or an sms message to the user 102 informing him that the network service provider $118_A$ may be blocking communications between the client 108 and the network 106. As is known in the art, the user 102 may have an email address which he can connect to e.g. using a different application than the client 108 on the device 104 or by using a different device than device 104. Similarly, as is known in the art, the user 102 may have telephone number at which he can receive sms messages, whereby the user may be able to retrieve the sms message using a different application than the client 108 on the device 104 or by using a different device than device 104. The communication system 100 may store details (e.g. "profiles") of the users in the communication system and as such the communication system 100 may store the email address and/or telephone number of the user 102, e.g. on a server of the communication system 100 which may, or may not, be the server 116 illustrated in FIG. 1. The server 116 may determine the user 102's email address and/or telephone number from the profile information stored by the communication system 100 for each user of the communication system, in order to send the notification by email and/or sms message as described above.

The blocks 302, 304 and 306 shown in FIG. 3 are implemented in software in the preferred embodiments described above, but in alternative embodiments, these component blocks may be implemented in hardware. Similarly, the method steps shown in FIG. 4 could be implemented at the device 104 or the server 116 respectively in software or in hardware. For example, the CPU 202 may execute processing blocks to implement the steps S404 to S414 and the steps S418 to S422. For example, a computer program product for analyzing the communication event may be provided, which can be stored in the memory 226 and executed by the CPU 202. The computer program product may be configured so as when executed on the CPU 202 to perform the method steps S404 to S414 and the steps S418 to S422. Alternatively, hardware blocks may be implemented in the device 104 to implement the steps S404 to S414 and the steps S418 to S422. Likewise the server side analysis of step S416 may be implemented in software or hardware.

In the preferred embodiments described above the analysis performed in step S416 is performed at the server 116. In alternative embodiments the analysis of step S416 could be performed at the client 108. In these alternative embodiments the information (e.g. that given in the bullet points above) used in step S416 regarding the data relating to other transmissions over the network 106 is transmitted to the client 108 so that the client 108 can perform the analysis to determine whether a poor condition experienced with the communication event is due to discrimination by the network service provider $118_A$ in the same way that the server 116 performs the analysis in step S416 described above. It may be beneficial to implement the analysis at the client 108 so that no transmission of data (between the client 108 and the server 116) is required to implement the method. This can be particularly beneficial when the network service provider $118_A$ is blocking communication between the client 108 and the server 116.

In some embodiments the analysis performed in step S416 could be implemented in a combination of the server 116 and the client 108. As an example, simple analysis that does not require comparison to other user's measurements may be conducted at the client 108. For example, the client 108 may detect a drastic jump in packet loss, but the client 108 might not be able to attribute this to a network service provider without comparing to other measurements. In an example, the server 116 could perform analysis involving comparing the measurements to other measurements in order to attribute the packet loss to a network service provider.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of analyzing a communication event occurring over a network by a communication client executed at a device to engage in the communication event via a network service provider through which the communication event occurs that provides access to the network, the method comprising the communication client:
    detecting a problem with the communication event;
    determining communication metric data relating to the communication event on the network service provider, including a particular type of data used in the communication event;
    comparing the communication metric data with other communication metric data, where the other communication metric data corresponds to a different communication event (i) performed by the communications client via a different network service provider and (ii) including the particular type of data;
    recognizing, based at least in part on said comparing, that the network service provider through which the communication event occurs discriminates against transmission over the network of the particular type of data used in the communication event;
    computing a confidence value indicative of a certainty with which the detected problem is caused by the discrimination against the particular type of data; and
    providing a notification to the device based on the confidence value that is indicative of the discrimination against the particular type of data.

2. The method of claim 1 wherein the notification includes a suggestion that the device uses another network service provider.

3. The method of claim 1 wherein said comparing uses the communication metric data and other data relating to the network.

4. The method of claim 3 wherein the other data comprises other communication metric data relating to transmission through the network of data other than the particular type of data used in the communication event.

5. The method of claim 3 wherein the other data comprises at least one of:
    (a) communication metric data associated with the device when using another network service provider;
    (b) communication metric data associated with another device using the network service provider through which the communication event occurs;
    (c) communication metric data associated with another device using another network service provider;
    (d) network conditions experienced by another type of data other than the particular type of data used in the communication event which is transmitted over the network;
    (e) data relating to the configuration of the network;
    (f) data relating to characteristics of operation of the network;
    (g) historical data associated with the device when using the network service provider through which the communication event occurs; and
    (h) historical notifications provided to the device when using the network service provider through which the communication event occurs or another network service provider.

6. The method of claim 1 wherein said comparing comprises comparing the communication metric data to at least one model.

7. The method of claim 1 wherein a form of the notification depends upon the confidence value.

8. The method of claim 1 wherein said providing the notification to the device comprises the communication client outputting the notification at the device.

9. The method of claim 1 wherein responsive to a determination that the detected problem prevents the notification from being provided to the device via the communication client, causing said providing the notification to the device to include sending a message including the notification to the device using a communication process which is separate from the communication client.

10. The method of claim 9 wherein the message comprises an email message or a Short Message Service message.

11. The method of claim 1 wherein the network service provider through which the communication event occurs discriminates against transmission over the network of a type of data used in the communication event by performing traffic shaping on data that passes over the network.

12. The method of claim 1 wherein the communication event is one of a file transfer, an audio call, a video call, an instant messaging session, a short message service messaging session, call forwarding, login of the device to the communication system, and a friend request in the communication system.

13. The method of claim 1 wherein the communication metric data is indicative of at least one of (i) a bandwidth experienced by the communication event on the network, (ii) a latency experienced by the communication event on the network, (iii) a jitter experienced by the communication event on the network, (iv) a packet loss experienced by the communication event on the network, (v) an identifier of the network service provider through which the communication event occurs, (vi) a country of the device, (vii) a country of a destination of the communication event, and (viii) an identifier of a user of the device.

14. The method of claim 1 wherein said detecting the problem with the communication event comprises determining whether the communication metric data is indicative of a scenario in which it is likely that the network service provider through which the communication event occurs is discriminating against transmission over the network of the particular type of data used in the communication event, wherein said comparing is performed responsive to determining that the communication metric data is indicative of the scenario.

15. The method of claim 14 wherein the detected communication metric data is indicative of the scenario when at least one of (i) a quality degradation is experienced in the communication event but a similar quality degradation is not experienced for data other than the particular type of data of the communication event being transmitted over the network; (ii) the quality of the communication event suddenly degrades, (iii) the communication event fails to become established; and (iv) the quality of the communication event degrades continuously.

16. The method of claim 1 wherein said comparing is based at least in part upon results of analysis performed on a server of the network obtained from the server responsive to transmission of the communication metric data from the communication client to the server to enable the analysis by the server.

17. The method of claim 16 further comprising transmitting the communication metric data from the communication client to the server.

18. A system comprising:
one or more processing devices and a network interface to provide access to a network for a communication client executed via the one or more processing devices to engage in a communication event over the network via a network service provider, wherein the communication client is configured to perform operations to:
detect a problem with the communication event;
determine communication metric data relating to the communication event on the network service provider, the communication event including Voice over Internet Protocol (VoIP) data;
compare the communication metric data with other communication metric data, where the other communication metric data corresponds to a different communication event (i) performed by the communication client on the network service provider and (ii) that includes non-VoIP data;
recognize, based at least in part on said comparing, that the network service provider discriminates against VoIP data used in the communication event;
compute a confidence value indicative of a certainty that the detected problem is caused by the discrimination against the VoIP data used; and
output a notification to the device that is based on the confidence value and indicative of the discrimination against the VoIP data.

19. A device configured to analyze a communication event occurring over a network via a communication client executable at the device to engage in the communication event and arranged to:
detect, by the communication client at the device, a problem with the communication event;
determine, by the communication client at the device, communication metric data relating to the communication event on a network service provider; the communication client arranged to transmit the communication metric data to a server of the network;
compare the communication metric data with other communication metric data, where the other communication metric data corresponds to communication events (i) performed by another communication client on another device using the same network service provider and (ii) performed by the communication client via a different network service provider;
recognize that the network service provider discriminates against transmission over the network of the particular type of data used in the communication event;
compute a confidence value indicative of a certainty that the detected problem is caused by the discrimination against the particular type of data; and
provide a notification to a user of the device that is based on the confidence value and indicative of the discrimination against the particular type of data.

20. A server of a network for analyzing a communication event occurring over the network via a network service provider comprising:
one or more processors; and
memory storing instructions executable via the one or more processors and configured to analyze the communication event by:
receiving, from a device, communication metric data relating to the communication event on the network service provider through which the communication event occurs, including a particular type of data used in the communication event;
comparing the communication metric data with other communication metric data, where the other communication metric data corresponds to a communication event (i) performed by another device via the same network service provider through which the communication event occurs and (ii) including the particular type of data;
recognizing, based at least in part on said comparing, that the network service provider through which the communication event occurs discriminates against transmission over the network of the particular type of data used in the communication event;
computing a confidence value indicative of a certainty that the detected problem is caused by the discrimination against the particular type of data; and
transmitting, to the device, a notification that is based on the confidence value and is indicative of the discrimination against the particular type of data for output by the device.

21. A client-side device configured to analyze a communication event occurring over a network via a communication client executable at the device to engage in the communication event via a network service provider, comprising:
a processor;
one or more computer readable media storing the communication client that when executed via the processor is configured to engage in the communication event by:
detecting, by the client-side device, a problem with the communication event;
determining, by the client-side device, communication metric data relating to the communication event on the network service provider, including a particular type of data used in the communication event;
comparing the communication metric data with other communication metric data, where the other communication metric data corresponds to a communication event (i) performed by the communications client via a different network service provider and (ii) including the particular type of data;

recognizing, based at least in part on said comparing that the network service provider discriminates against transmission over the network of the particular type of data used in the communication event;

computing a confidence value indicative of a certainty that the detected problem is caused by the discrimination against the particular type of data; and configuring a notification indicative of the discrimination against the particular type of data based on the confidence value.

22. A device configured to analyze a communication event occurring over a network through a network service provider that provides access to the network comprising:

hardware; and a communication client executable at least partially via the hardware to engage in the communication event, the communication client including:

a detecting block configured to detect a problem with the communication event;

a metric determining block configured to determine communication metric data relating to the communication event on the on the network service provider through which the communication event occurs, including a particular type of data used in the communication event;

a comparison block configured to determine differences between the communication metric data and other communication metric data, where the other communication metric data corresponds to a communication event (i) performed by the communications client via a different network service provider and (ii) including the particular type of data;

a recognition block configured to use the communication metric data to determine:

the network service provider through which the communication event occurs discriminates against transmission over the network of the particular type of data used in the communication event; and a confidence value indicative of a certainty that the detected problem is caused by the discrimination of the transmission of the particular type of data;

an identification block configured to perform server analysis to identify a suggested service provider that does not discriminate against the particular type of data; and a notification block configured to provide a notification based on the confidence value indicative of the discrimination against the particular type of data for communication to the device, the notification including a suggestion to use the suggested service provider that does not discriminate against the particular type of data.

\* \* \* \* \*